3,086,320
PROCESS AND COMPOSITION FOR GROWING MUSHROOM MYCELIUM SUBMERGED FERMENTATION

Burdet Heinemann, Springfield, Mo., assignor to Producers Creamery Company, Springfield, Mo., a corporation of Missouri
No Drawing. Filed Aug. 8, 1961, Ser. No. 129,956
12 Claims. (Cl. 47—1.1)

This invention relates to the production of mushroom mycelium. More particularly, this invention relates to improved culture conditions and an improved fermentation medium which produce improved flavor in mushroom mycelium.

Considerable research and experimentation has been conducted relating to the production of edible mushroom mycelium by fermentation processes. Needless to say, these processes have been extensively investigated in governmental, institutional and industrial laboratories for several years. However, the products resulting from the processes heretofore utilized have not had full commercial acceptance since the mycelium, while similar in flavor to the natural sporophore, falls short in matching it in intensity and kind.

The isolation and selection of improved strains of mushroom mycelium may, no doubt, result in improved flavor. Nevertheless, to date, this has not been accomplished. Another approach in flavor improvement is to improve the culture medium through the use of flavor precursors.

Those skilled in the art would expect to find that flavor precursors and stimulants would be found in the extracts oil soil, compost, straw, starch, wood and the like. These, however, have been tested and none have been found to be of significant value. Corn steep liquor perhaps has been the most favored protein source utilized heretofore. Pear waste, asparagus juice, sulfite liquor and many other organic nitrogen containing compounds have also been used. The use of these components has not, however, resulted in a commercially acceptable product. Whey has also been suggested as a medium for the growth of mushroom mycelium and while it will support growth, it is not superior component.

It is therefore an object of this invention to provide an improved process for the production of mushroom mycelium by submerged culture techniques.

It is another object of the invention to provide such a process by which flavor of the mushroom mycelium is substantially improved.

It is still another object of this invention to provide an improved fermentation medium for growth of mushroom mycelium in submerged mushroom culture.

It is a further object of this invention to provide an improved process and fermentation medium for mushroom mycelium which produces a flavor development equalling or surpassing the flavor of the natural sporophore.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has been found that the above objects may be attained in a method for mushroom mycelium growth wherein the nutrient medium contains skim milk. This method unexpectedly and unaccountedly results in a product of superior flavor and increased yield. Natural skim milk is utilized in amounts from 1 to 50% of the nutrient medium. Condensed skim milk in an amount of about one-third that of natural skim milk, and non-fat dry milk solids in an amount of about 10% of the weight of the natural milk may be substituted, the balance in each case being made up with water. Milk protein hydrolysate in an amount of about 5% of the weight of the natural milk may be used and the balance made up with water. However, as will be seen hereinafter, the hydrolysate is only slightly superior to corn steep liquor in growth promoting characteristics.

The skim milk is conveniently utilized in amounts between 5 and 10% of the total nutrient medium. Within this range the yield of mycelium is not greatly affected, but the percent of protein in the cycelium is substantially increased with higher levels of skim milk and this is shown in the following table. There is also a slight increase in flavor as the protein content increases.

TABLE 1

| Skim milk used (percent) | Yield, oz. Dry Mycelium per gallon | Number of Trials | Percent Protein (dry basis) |
|---|---|---|---|
| 5 | 1.17 | 4 | 38.06 |
| 7.5 | .99 | 5 | 41.91 |
| 10.0 | 1.08 | 3 | 46.12 |

Mushroom mycelium may be cultured in many different media. Essentially, the media must contain, in water, a carbohydrate as a source of energy, a source of nitrogen and suitable minerals. As noted above, skim milk has been discovered as a source of nitrogen which gives unexpectedly improved results in yield and flavor characteristics. A typical medium which has been found to be particularly suitable is as follows:

TABLE 2

Ingredient: Amount
Ammonium phosphate (as an inorganic
  source of nitrogen)_____gm__ 3.4
Trace element stock solution
  (supplying mineral nutrients)_____ml__ 25
Calcium carbonate (as a buffer
  and source of calcium)_____gm__ 3
Silicon antifoam emulsion_____gm__ 3.5
Dextrose _____gm__ 25
Skim milk (natural)_____ml__ 50
Water to 1000 ml.

The trace element stock solution which is noted as an ingredient in the typical nutrient medium listed above has the following composition:

TABLE 3

Magnesium sulfate _____gm__ 108
Potassium phosphate _____gm__ 108
Potassium sulfate_____gm__ 68
Ferrous sulfate (1% solution)_____ml__ 76
Manganous sulfate (5% solution)_____ml__ 40
Zinc chloride (1% solution)_____ml__ 33
Cupric sulfate (1% solution)_____ml__ 16
Cobalt nitrate (1% solution)_____ml__ 10
Distilled water to two liters.

The process, as it is practiced, is as follows: Sporophores are collected from their natural habitat, brought to the laboratory and test tube cultures made therefrom. Edible species such as *Coprinus comatus, Helvella gigas, Morchella esculenta* and *Agaricus campestris* are examples of such mushrooms which may be cultured. The mycelium is grown on solid medium until substantial growth occurs and is then transferred to flasks containing 250 ml. of the skim milk medium described in Table 2. After 3 to 5 days incubation with constant aeration and agitation at room temperature, the mushroom mycelium is transferred to bottles containing 7 liters of sterile milk medium and aerated at the rate of one volume of air per minute per volume of medium. After further incubation for 3 to 5 days, this quantity may be used to inoculate 10 to 20 times its volume of fresh sterile milk medium. The resultant growth is harvested by filtration and may be dried by tray drying, spray drying or other commercial methods of dehydration to less than 12% moisture. The dried mushroom mycelium is then ground to a fine powder and packaged for distribution.

Preferably, the growth is conducted at atmospheric pressure although other pressures may be used. The temperature conditions used are those under which the mycelium inoculum is accustomed to grow and generally will lie within the range of 33° to 85° F. Higher temperatures may be used up to the temperatures at which the mycelium is killed or destroyed.

Aerobic conditions are provided by passing air or other oxygen-containing gas through the medium and/or by any suitable moderate and efficient agitation. The nutrient medium is maintained at a pH suitable for growth of mycelium, and generally this will be in the range of 4.5 to 8.5.

In the following examples and throughout the specification and claims all parts are parts by weight unless otherwise specified.

*Example 1*

Test tube cultures were prepared on solid media from spores or sporophores of the species *Coprinus comatus*. After substantial growth on the solid medium had occurred, the densely grown mycelium suspended in liquid substrate was transferred to a flask containing 250 ml. of the nutrient medium described in Table 2. The mycelium was incubated for about 4 days with constant aeration and agitation at room temperature after which it was transferred to a bottle containing 7 liters of the same sterile milk medium and aerated at the rate of one volume of air per minute per volume of medium. After further incubation for about 4 days the growth was harvested by filtration.

*Example 2*

The process described in Example 1 was repeated utilizing sporophores of the species *Helvella gigas*.

*Example 3*

The process described in Example 1 was repeated utilizing spores or sporophores of the species *Morchella esculenta*.

*Example 4*

The procedure set forth in Example 1 was carried out using sporophores of the species *Agaricus campestris*.

*Example 5*

In order to demonstrate the improved results when utilizing a nutrient medium comprising skim milk, an experiment was conducted wherein cultures of the species *Morchella crassipes* were grown in a skim milk medium, in a second similar medium wherein the skim milk was replaced with corn steep liquor, and in a third similar medium wherein a milk protein hydrolysate was substituted for the skim milk. The composition of the media was as follows:

TABLE 4

| Ingredient | Corn Steep | Milk Protein Hydrolysate [1] | Skim Milk |
|---|---|---|---|
| Ammonium phosphate_____g__ | 2.0 | 3.4 | 3.4 |
| Trace element stock solution___ml__ | 25.0 | 25.0 | 25.0 |
| Calcium carbonate_____g__ | 3.0 | 2.0 | 3.0 |
| Silicon AF Emulsion_____g__ | 3.5 | 3.5 | 3.5 |
| Cerelose_____g__ | 25.0 | 25.0 | 25.0 |
| Corn steep liquor_____g__ | 10.0 | | |
| Milk Protein Hydrolysate_____g__ | | 2.0 | |
| Skim milk_____ml__ | | | 50.0 |
| Tap water to_____ml__ | 1,000 | 1,000 | 1,000 |

[1] Pancreatic digest of casein.

The mycelium in each case was grown under the conditions described in Example 1 and the comparative results are shown in the following table:

TABLE 5

| Type of Medium | No. of Trials | Average dry Wt. per trial [1] | Average Flavor Score |
|---|---|---|---|
| Corn Steep Liquor_____ | 8 | 44.00 | 16.4 |
| Milk protein hydrolysate_____ | 6 | 46.67 | 17.3 |
| Skim milk_____ | 14 | 56.71 | 17.9 |

[1] Grams per 7 liters of medium.

In the above table, average flavor scores have been assigned to the mycelium. These flavor scores are based on an arbitrary system in which a value range from 0 to 20 is assigned to samples containing no mushroom flavor (0 points) to those containing exceptionally high flavor (20 points). As a control, a filtrate was prepared by adding 10 grams of natural mushroom sporophores of the species *Morchella crassipes* to 100 ml. of tap water, heating to boiling and filtering. Such a filtrate is usually assigned a score of 17 to 18. Samples of mushroom mycelium which are considered unsatisfactory for commercial use usually scored below 16. It may be seen from Table 5 that mushroom mycelium produced using corn steep liquor as the chief nitrogen source is actually borderline in flavor acceptability, while those using skim milk or protein hydrolysate are equal to or superior to the natural sporophore. While the mycelium grown in the skim milk nutrient medium had only a slightly higher flavor score, the weight produced is substantially greater than that of the mycelium grown in either of the other two media. While skim milk and the other natural milks described above are preferred, the natural fresh whole lacteal fluid from cows and natural whole milk, as well as mixtures of the several milks described herein, are useful.

In addition to the spores described above, a number of mushroom species may be cultured in natural milk-containing medium. I have grown several species of the genus of Morchella, as in Examples 3 and 5. These are *hortensis*, *angusticeps* and *rotunda*. I have also grown *Naucoria semiorbicularis* and *Boletus indecisus*. The invention is not restricted to edible mushrooms.

I have also used this same medium for growing *Penicillium roqueforti* and the addition of milk or milk-containing products is desirable as an adjunct in the fermentation of substantially any fungi, e.g., for the growth of *Aspergillus niger* which organism is used in the production of citric acid, as well as other organic acids and enzymes. This invention has application not only to the growth of mushroom mycelium but also covers the fungi of the phylum Eumycophyta and the classes Phycomycetes, Ascomycetes, Basidiomycetes and Deuteromycetes by the use of milk as a fermentation adjunct for the growth of the fungi. As far as I am aware, natural milk has never been used for this purpose in the field of industrial fermentations.

While I have described above, the growth of mycelium in three steps, I have cultured the mycelium in one step to as many as nine steps.

The mycelium is useful in a number of ways such as in the fresh state or preserved by freezing. In all cases, the medium is "sterile," sterilization being accomplished in conventional ways as by heating the medium at 15 pounds pressure for 20 minutes or at 280° F. for one minute. Stated in another way, an $F_0$ value of between 5 and 50 should be employed depending upon heating conditions, reference being had to the patent to Stewart, 2,886,450, column 3.

The pH of the medium normally does not need adjustment but when necessary it may be adjusted with dilute solutions of sodium carbonate, sodium hydroxide or other alkali and lactic acid, hydrochloric acid or other acids. This is preferably done before sterilization.

What is claimed is:

1. A process for the production of mushroom mycelium with improved flavor which comprises inoculating a sterile milk-containing medium with mushroom mycelium, incubating the culture under aerobic conditions and at a temperature of between about 33° and 85° F. and harvesting the mycelium grown during the incubation.

2. The process according to claim 1 wherein the milk is skim milk.

3. The process according to claim 1 wherein the inoculated medium is aerated and agitated during incubation thereof.

4. The process according to claim 1 wherein the harvested mycelium is thereafter dried to less than 12% moisture and ground to a powder.

5. The process according to claim 1 wherein the medium has a pH between 4.5 and 8.5.

6. The process according to claim 1 wherein the mycelium is taken from the species *Morchella esculenta*.

7. The process according to claim 1 wherein the mycelium is taken from the species *Helvella gigas*.

8. The process according to claim 1 wherein the mycelium is taken from the species *Coprinus comatus*.

9. The process according to claim 1 wherein the mycelium is taken from the species *Agaricus campestris*.

10. A nutrient medium for growing mushroom mycelium under aerobic conditions comprising water, a carbohydrate source, a source of mineral nutrients and from 1 to 50% by weight skim milk, said medium having a pH between 4.5 and 8.5.

11. The medium according to claim 10 wherein the skim milk is added as non-fat dry milk solids with additional water to reconstitute said solids to substantially the strength of natural skim milk.

12. The medium according to claim 10 wherein the skim milk is added as condensed skim milk with additional water to reconstitute said condensed milk to substantially the strength of natural skim milk.

References Cited in the file of this patent

UNITED STATES PATENTS

| | | |
|---|---|---|
| 2,618,900 | Humfeld | Nov. 25, 1952 |
| 2,693,665 | Humfeld | Nov. 9, 1954 |
| 2,761,246 | Szuecs | Sept. 4, 1956 |
| 2,886,450 | Stewart | May 12, 1959 |

OTHER REFERENCES

"A Compilation of Culture Media For the Cultivation of Micro-organisms" (Levine), published by Williams and Wilkins Co. (Baltimore), 1930, p. 771 relied on.

"American Illustrated Medical Dictionary" (Dorland), 22nd Edition, Pub. by Saunders (Phila.), 1951. Pages 375 and 925 relied on.

Stoller: "Principles and Practice of Mushroom Culture," Pub. March 1954 in Economic Botany (Magazine), vol. 8, No. 1, pages 48 through 95 in all, but only pages 65, 66, 67 relied on.